(12) United States Patent
Gaddam et al.

(10) Patent No.: US 12,659,150 B2
(45) Date of Patent: Jun. 16, 2026

(54) EFFICIENT AND SECURE KEY ROTATION FOR BACKUP STORAGE

(71) Applicant: Cohesity, Inc., San Jose, CA (US)

(72) Inventors: Sivanarayana Gaddam, Santa Clara, CA (US); Anubhav Gupta, San Jose, CA (US); Venkata Ranga Radhanikanth Guturi, San Jose, CA (US); Gyan Prakash, Foster City, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/787,690

(22) Filed: Jul. 29, 2024

(65) Prior Publication Data

US 2026/0031986 A1      Jan. 29, 2026

(51) Int. Cl.
*H04L 9/08* (2006.01)
*G06F 21/60* (2013.01)

(52) U.S. Cl.
CPC .......... *H04L 9/0891* (2013.01); *G06F 21/602* (2013.01); *H04L 9/0822* (2013.01)

(58) Field of Classification Search
CPC .... H04L 9/0891; H04L 9/0822; G06F 21/602
See application file for complete search history.

(56) References Cited

U.S. PATENT DOCUMENTS

| | | | | |
|---|---|---|---|---|
| 9,158,896 B2 * | 10/2015 | Cox | ...................... | H04L 9/0866 |
| 9,336,092 B1 * | 5/2016 | Li | ......................... | G06F 21/602 |
| 2006/0123250 A1 * | 6/2006 | Maheshwari | .......... | G06F 16/90 |
| | | | | 713/193 |
| 2018/0007025 A1 * | 1/2018 | Oberheide | ............... | H04L 9/14 |
| 2020/0053065 A1 | 2/2020 | Wisniewski et al. | | |
| 2021/0144141 A1 * | 5/2021 | Lee | ...................... | H04L 9/0897 |
| 2022/0407685 A1 | 12/2022 | Xie et al. | | |

OTHER PUBLICATIONS

Extended Search Report from counterpart European Application No. 24209321.9 dated Apr. 17, 2025, 6 pp.

* cited by examiner

*Primary Examiner* — Abiy Getachew
(74) *Attorney, Agent, or Firm* — Shumaker & Sieffert, P.A.

(57) ABSTRACT

Techniques are described for efficient and secure key rotation for backup storage. An example method comprises generating, by a data platform implemented by a computing system, a first encrypted key and a second encrypted key, wherein the data platform stores one or more encrypted chunks encrypted using a first encryption key of the first encrypted key and a second encryption key from the second encrypted key, the first encrypted key and the second encrypted key encrypted with a first system key, replacing the first system key by determining a second system key, and encrypting, with the second system key, the first encryption key to generate a replacement first encrypted key and the second encryption key to generate a replacement second encrypted key.

20 Claims, 6 Drawing Sheets

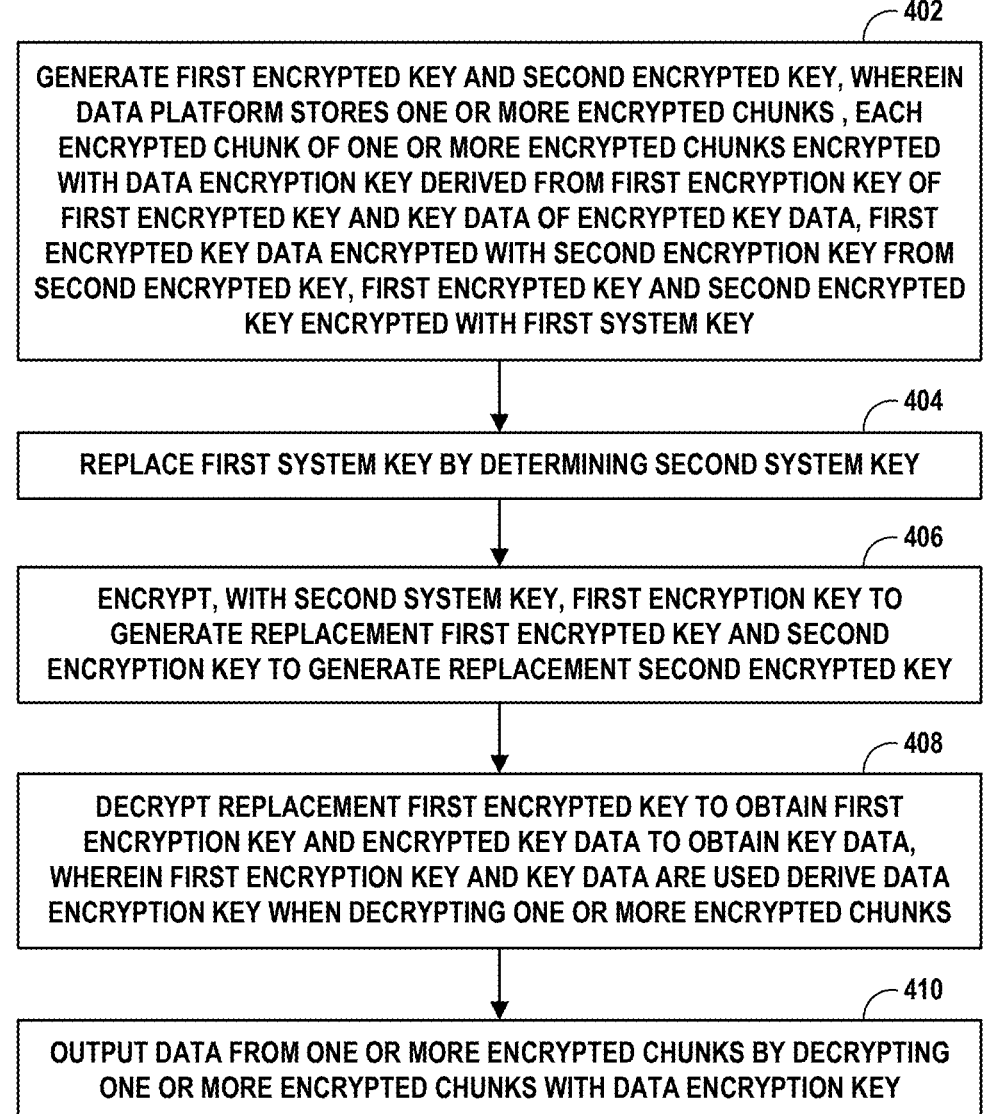

402

GENERATE FIRST ENCRYPTED KEY AND SECOND ENCRYPTED KEY, WHEREIN DATA PLATFORM STORES ONE OR MORE ENCRYPTED CHUNKS , EACH ENCRYPTED CHUNK OF ONE OR MORE ENCRYPTED CHUNKS ENCRYPTED WITH DATA ENCRYPTION KEY DERIVED FROM FIRST ENCRYPTION KEY OF FIRST ENCRYPTED KEY AND KEY DATA OF ENCRYPTED KEY DATA, FIRST ENCRYPTED KEY DATA ENCRYPTED WITH SECOND ENCRYPTION KEY FROM SECOND ENCRYPTED KEY, FIRST ENCRYPTED KEY AND SECOND ENCRYPTED KEY ENCRYPTED WITH FIRST SYSTEM KEY

404

REPLACE FIRST SYSTEM KEY BY DETERMINING SECOND SYSTEM KEY

406

ENCRYPT, WITH SECOND SYSTEM KEY, FIRST ENCRYPTION KEY TO GENERATE REPLACEMENT FIRST ENCRYPTED KEY AND SECOND ENCRYPTION KEY TO GENERATE REPLACEMENT SECOND ENCRYPTED KEY

408

DECRYPT REPLACEMENT FIRST ENCRYPTED KEY TO OBTAIN FIRST ENCRYPTION KEY AND ENCRYPTED KEY DATA TO OBTAIN KEY DATA, WHEREIN FIRST ENCRYPTION KEY AND KEY DATA ARE USED DERIVE DATA ENCRYPTION KEY WHEN DECRYPTING ONE OR MORE ENCRYPTED CHUNKS

410

OUTPUT DATA FROM ONE OR MORE ENCRYPTED CHUNKS BY DECRYPTING ONE OR MORE ENCRYPTED CHUNKS WITH DATA ENCRYPTION KEY

FIG. 4

EFFICIENT AND SECURE KEY ROTATION FOR BACKUP STORAGE

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for efficient and secure key rotation for backup storage. Envelope encryption has been widely used to encrypt data at rest. In general, a system may perform envelope encryption by encrypting data with a data encryption key (DEK) and then encrypting the DEK with a key encryption key (KEK). For security and/or compliance purposes, organizations (e.g., enterprises) may require key rotation policies from data protection vendors. Key rotation policies typically involve rotating (e.g., changing) the KEK every three to six months. Whenever the KEK is rotated, the DEK may be re-encrypted using the new KEK, which depreciates the old KEK.

Encryption may not guarantee complete data protection in cases where unauthorized parties gain access to a data platform such as by system intrusion or other unauthorized access. For example, in the event of a successful system intrusion, an unauthorized party may access DEKs and, with the DEKs, the unauthorized party may decrypt and exfiltrate data. Similarly, privilege misuse may cause DEKs to become accessible thereby allowing encrypted data to be decrypted and exfiltrated by the unauthorized parties.

Some systems deploy a key rotation job which iterates through each encrypted DEK (EDEK) encrypted with the previous KEK and replaces the EDEK with a new EDEK encrypted with the new KEK. As such, these key rotation jobs may perform O(n) re-encryptions, where n is the number of DEKs created during the encryption process. In systems with very large volumes of data (e.g., multiple gigabytes, terabytes, or more), O(n) re-encryptions may be computationally expensive and may take considerable amounts of time (e.g., one or more days). In systems where EDEKs are stored along with the encrypted data, re-encryption may not be feasible to perform.

The techniques described herein provide efficient and secure key rotation for backup storage, including for backups where EDEKs are stored along with the encrypted backup data. Various aspects of the techniques may provide improved efficiency during key rotation. For example, in accordance with the described techniques, a data platform may perform O(1) rather than O(n) re-encryptions in connection with key rotation, a data platform may avoid modifying previously stored backups in connection with key rotation, or both.

The described techniques may provide one or more technical advantages that realize a practical application. For example, the described techniques may improve data security by permitting key rotation to be performed more efficiently (e.g., O(1) versus O(n) re-encryptions) and without high consumption of computing resources even when there is a very large amount of encrypted backup data (e.g., multiple gigabytes, terabytes, or more). Key rotation may be performed to mitigate and/or prevent security issues relating to unintended or unauthorized use of DEKs or KEKs (e.g., unauthorized data access/exfiltration, privilege misuse). The efficiency of the described techniques may reduce system load and/or system downtime and may permit key rotation to be performed more frequently to further mitigate and/or prevent security issues relating to unintended or undesired leaks of DEKs or KEK. The security improvements result in reduced use of computing resources by preventing exfiltration of large amounts of data (e.g., gigabytes or terabytes of data) which present a security risk and consume significant computing resources.

Although the techniques described in this disclosure are primarily described with respect to a backup function of a data platform (e.g., key rotation for backups), similar techniques may be applied for an archive function (e.g., key rotation for archives or other write once, read many (WORM) storage) or other similar function of the data platform.

In one example, this disclosure describes a method comprising generating, by a data platform implemented by a computing system, a first encrypted key and a second encrypted key, wherein the data platform stores one or more encrypted chunks, each encrypted chunk of the one or more encrypted chunks encrypted with a data encryption key derived from a first encryption key of the first encrypted key and key data of encrypted key data, the first encrypted key data encrypted with a second encryption key from the second encrypted key, the first encrypted key and the second encrypted key encrypted with a first system key, replacing, by the data platform, the first system key by determining a second system key, encrypting, by the data platform and with the second system key, the first encryption key to generate a replacement first encrypted key and the second encryption key to generate a replacement second encrypted key, decrypting, by the data platform, the replacement first encrypted key to obtain the first encryption key and the encrypted key data to obtain the key data, wherein the first encryption key and the key data are used derive the data encryption key when decrypting the one or more encrypted chunks, and outputting, by the data platform, data from the one or more encrypted chunks by decrypting the one or more encrypted chunks with the data encryption key.

In another example, this disclosure describes a computing system comprising a memory storing instructions, and processing circuitry that executes the instructions to: generate a first encrypted key and a second encrypted key, wherein the data platform stores one or more encrypted chunks, each encrypted chunk of the one or more encrypted chunks encrypted with a data encryption key derived from a first encryption key of the first encrypted key and key data of encrypted key data, the first encrypted key data encrypted with a second encryption key from the second encrypted key, the first encrypted key and the second encrypted key encrypted with a first system key, replace the first system key by determining a second system key, encrypt, with the second system key, the first encryption key to generate a replacement first encrypted key and the second encryption key to generate a replacement second encrypted key, decrypt the replacement first encrypted key to obtain the first encryption key and the encrypted key data to obtain the key data, wherein the first encryption key and the key data are used derive the data encryption key when decrypting the one or more encrypted chunks, and output data from the one or more encrypted chunks by decrypting the one or more encrypted chunks with the data encryption key.

In another example, this disclosure describes a computer-readable storage medium comprising instructions that, when executed, cause processing circuitry of a computing system to: generate a first encrypted key and a second encrypted key, wherein the data platform stores one or more encrypted chunks, each encrypted chunk of the one or more encrypted chunks encrypted with a data encryption key derived from a first encryption key of the first encrypted key and key data of encrypted key data, the first encrypted key data encrypted with a second encryption key from the second encrypted key, the first encrypted key and the second encrypted key encrypted with a first system key, replace the first system key by determining a second system key, encrypt, with the second system key, the first encryption key to generate a replacement first encrypted key and the second encryption key to generate a replacement second encrypted key, decrypt the replacement first encrypted key to obtain the first encryption key and the encrypted key data to obtain the key data, wherein the first encryption key and the key data are used derive the data encryption key when decrypting the one or more encrypted chunks, and output data from the one or more encrypted chunks by decrypting the one or more encrypted chunks with the data encryption key.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 4 is a flowchart illustrating an example mode of operation for a data platform to perform efficient and secure key rotation for backup storage, in accordance with techniques of this disclosure.

Like reference characters denote like elements throughout the text and figures.

DETAILED DESCRIPTION

Figure 1A:
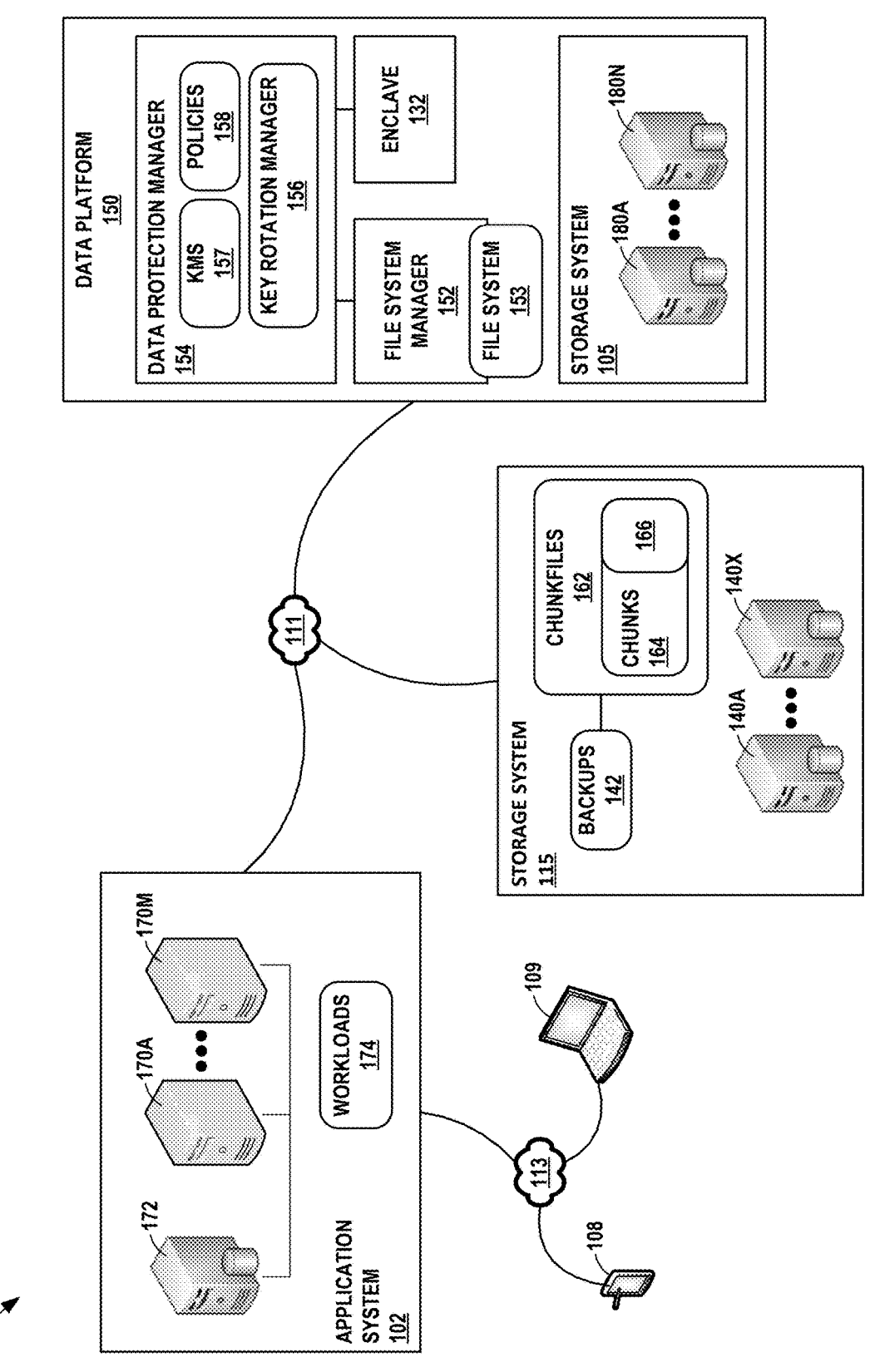
FIGS. 1A-1B are block diagrams illustrating example systems that perform efficient and secure key rotation for backup storage, in accordance with techniques of this disclosure.
Figure 1B:
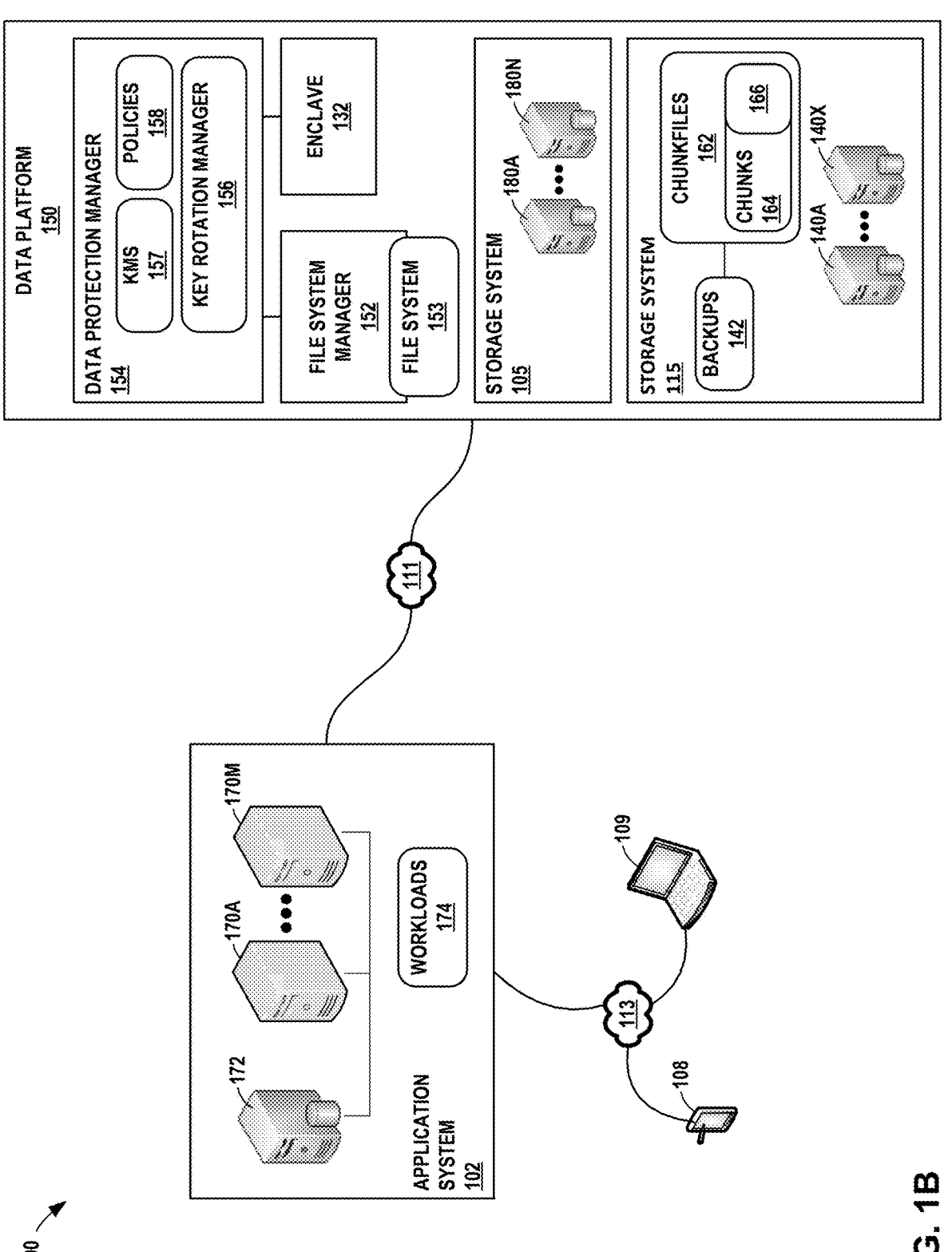

FIGS. 1A-1B are block diagrams illustrating example systems that perform efficient and secure key rotation for backup storage, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes® pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, such as through storage system 105 and separate storage system 115. Data platform 150 may implement a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111, 113 using a communication protocol, as if such file system data was stored locally (e.g., to a hard disk of a device of application system 102). Example communication protocols for accessing files and objects include Server Message Block (SMB), Network File System (NFS), or Amazon® Simple Storage Service (S3®). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and data protection manager 154 in the example of system 100, and store objects and metadata for data platform 150 to storage media. In some examples, separate compute devices (not shown) execute software for data platform 150, such as file system manager 152 and data protection manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as one or more physical clusters, virtual clusters, or a cloud-based clusters running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Backups 142 created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," file system 153 for application system 102 may alternatively be referred to as a "source file system," and storage system 105 may alternatively be referred to as a "source storage system." Application system 102 may for some purposes communicate directly with storage system 105 via network 111, 113 to transfer objects, and for some purposes communicate with file system manager 152 via network 111, 113 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes data protection manager 154 that may provide backups of file system data for file system 153. In the example of system 100, data protection manager 154 may store one or more backups 142 of file system data, stored by storage system 105, to one or more storage systems 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed at and managed by a cloud storage provider and referred to as a "cloud storage system." Example cloud storage providers include, e.g., AMAZON WEB SERVICES (AWS®) by AMAZON, INC., AZURE® by MICROSOFT, INC., DROPBOX® by DROPBOX, INC., ORACLE CLOUD® by ORACLE, INC., and GOOGLE® CLOUD PLATFORM (GCP) by GOOGLE, INC. In some examples, storage system 115 is co-located with storage system 105 in a data center, on-prem, or in a private, public, or hybrid private/public cloud. Storage system 115 may be referred to as an "external target" for backups 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on storage system 105 to support latency sensitive applications. However, because storage system 105 is often more difficult or expensive to scale, data platform 150 may use storage system 115 to support use cases such as backup and archive. A file system backup may be a copy of file system 153 to support protecting file system 153 for quick recovery, often due to some data loss in file system 153, and a file system archive ("archive") may be a copy of file system 153 to support longer term retention and review. The "copy" of file system 153 may include such data as is needed to restore or view file system 153 in its state at the time of the backup or archive.

Data protection manager 154 may backup file system data for file system 153 at any time in accordance with backup policies 158 that specify, for example, backup periodicity and timing (daily, weekly, etc.), which file system data is to be stored, a backup retention period, storage location, access control, and so forth. An initial backup 142 of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups 142 of the file system 153 may correspond to respective states of the file system 153 at respective subsequent backup creation times, i.e., after the backup creation time corresponding to the initial backup. A subsequent backup 142 may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored to storage system 115. File system data that is included in a subsequent backup may be deduplicated by data protection manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, data protection manager 154 stores file system data to storage system 115 as backups 142, using chunkfiles 162. Data protection manager 154 may use any of backups 142 to subsequently restore the file system (or portion thereof) to its state at the backup creation time, or backup 142 may be used to create or present a new file system (or "view") based on backup 142, for instance. As noted above, data protection manager 154 may deduplicate file system data included in a subsequent backup 142 against file system data that is included in one or more previous backups. For example, a second object of file system 153 and included in a second backup 142 may be deduplicated against a first object of file system 153 and included in a first, earlier backup. Data protection manager 154 may remove a chunk of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of backups 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 kB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of backups 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects over multiple backups results in chunkfiles 162 that each have multiple chunks 164 for multiple different objects associated with the multiple backups. In some examples, different backups 142 may have objects that are effectively copies of the same data, e.g., for an object of the file system that has not been modified. An object of a backup may be represented or "stored" as metadata having references to chunks that enable the object to be accessed. Accordingly, description herein to a backup "storing," "having," or "including" an object includes instances in which the backup does not store the data for the object in its native form.

The initial backup and the one or more subsequent incremental backups may each be associated with a corresponding retention period and, in some cases, a data lock period for the backup. As described above, a data management policy (not shown) may specify a retention period for a backup and a data lock period for a backup. A retention period for a backup is the amount of time for which the backup and the chunks that objects of the backup reference are to be stored before the backup and the chunks are eligible to be removed from storage. The retention period for the backup begins when the backup is stored (the backup creation time). A chunkfile containing chunks that objects of a backup reference and that are subject to a retention period of the backup, but not subject to a data lock period for the backup, may be modified at any time prior to expiration of the retention period. The nature of such a modification must be such to preserve the data referenced by objects of the backup.

A user or application associated with application system 102 may have access (e.g., read or write) to a backup that is stored in storage system 115. The user or application may delete some of the data due to a malicious attack (e.g., virus, ransomware, etc.), a rogue or malicious administrator, and/ or human error. The user's credentials may be compromised and as a result, the backup that is stored in storage system 115 may be subject to ransomware. To reduce the likelihood of accidental or malicious data deletion or corruption, in addition to the protections described herein, a data lock having a data lock period may be applied to a backup 142.

As described above, chunkfiles 162 may represent an object in a backup storage system (shown as "storage system 115," which may also be referred to as "backup storage system 115") that conform to an underlying architecture of backup storage system 115. Data platform 150 includes data protection manager 154 that supports storing backups 142 in the form of chunkfiles 162, which interface with backup storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Data protection manager 154 may protect backups 142, archives, or other copies of file system data by controlling access to backups 142. For example, data protection manager 154 may encrypt chunks 164 of backup 142 prior to storage on storage system 115 and require user authentication prior to decryption of encrypted chunks 164. As will be described further herein, data protection manager 154 may utilize key encryption keys, encryption keys, key data, and data encryption keys to encrypt and/or decrypt chunks 164 of backup 142 and rotate keys for the purpose of protecting (e.g., preventing unauthorized decryption/exfiltration) backups 142. Though described primarily with respect to chunks 164 and backups 142, the encryption, decryption and key rotation techniques described herein may be applied to backups, archives, or other write once, read many (WORM) storage as well as to other similar copies of data.

Data protection manager 154 may perform one or more management functions (e.g., creation, deletion, revision, storage, authentication, validation, access control) for encryption information (e.g., key data, encryption keys, including data encryption keys, certificates), authentication information (e.g., usernames or user identifiers and passwords) related to encryption and/or decryption of chunks 164. In some examples, data protection manager 154 may perform at least some management functions through use of confidential computing. Some examples of confidential computing platforms include INTEL® SGX/TDX by INTEL Corporation, AMD® SEV by ADVANCED MICRO DEVICES, INC., AWS NITRO SYSTEM® by AMAZON, Inc., NVIDIA® H100 by NVIDIA Corporation, AZURE® CONFIDENTIAL COMPUTE by MICROSOFT Corporation, and GOOGLE® CLOUD by ALPHABET Inc.

In some examples, data protection manager 154 may utilize an enclave 132 that provides encryption, decryption, data storage, or other functionality within a trusted execution environment of a confidential computing platform or system of data platform 150. The trusted execution environment may comprise isolated hardware, such as isolated processing circuitry of one or more processors, one or more protected memory regions, or both. The trusted execution environment may be considered secure or "trusted" in that trusted execution environment is isolated such that operating system, application, or other software, regardless of privilege level, cannot directly access or modify instructions within the hardware regions.

A trusted execution environment may be verified, such as through an external attestation system, to ensure the integrity of trusted execution environment (e.g., that software and/or hardware of trusted execution environment are genuine and unadulterated). The attestation system may be a third party trust authority for example, such as an INTEL® Trust Authority by INTEL Corporation, that can evaluate an attestation and verify whether the trusted execution environment of enclave 132 is genuine or legitimate. The attestation may include an indication that, if verified by the attestation system, establishes the integrity of the trusted execution environment (e.g., the trusted execution environment is genuine or, in other words, not security compromised). Data platform 150 may receive an indication of the validity or invalidity of the attestation from the attestation system after the attestation system validates, or is unable to validate, the attestation. Data platform 150 may disable one or more functions of enclave 132 in response to receiving an indication that the attestation is invalid. For example, data platform 150 may disable enclave 132 to prevent use of enclave 132. Data platform 150 may enable or refrain from disabling enclave 132 in response to receiving an indication that the attestation is valid.

Enclave 132 may provide access to functions of enclave 132 to elements outside of the trusted execution environment of enclave 132. For example, enclave 132 may establish one or more secure sessions (e.g., secured communication) between enclave 132 and data protection manager 154, as shown in the example of FIG. 1A, or other devices or systems outside of the trusted execution environment, such as storage systems 105, storage system 115, and application system 102 to securely communicate with such devices or systems. In some examples, enclave 132 may implement an API or remote procedure call framework (e.g., gRPC) to provide access to functions or data of enclave 132.

Data protection manager 154 may include key management system (KMS) 157 to initialize or establish (e.g., generate and store) various encryption information for encryption purposes (e.g., encrypting and decrypting data, such as chunks 164 of backups 142). For example, key management system 157 may generate one or more encryption keys, one or more key encryption keys (KEKs) for encrypting/decrypting encryption keys, one or more data encryption keys (DEKs) for encrypting/decrypting data (e.g., chunks 164), or various subsets thereof that data protection manager 154 may use for encryption purposes. Key management system 157 may generate an encryption key by generating a sequence of bits that, when applied to encrypted data, decrypts the encrypted data, to obtain (e.g., reveal) the original data from the encrypted data. Data protection manager 154 may apply an encryption key comprising such a sequence of bits generated by key management system 157 to original data to encrypt the original data and thereby generate encrypted data.

Key management system 157 may generate and use various types of encryption keys, including symmetric keys and asymmetric keys (e.g., public/private key pairs of a public key infrastructure (PKI)). For example, key management system 157 may generate a symmetric key to encrypt original data to generate encrypted data and to decrypt the encrypted data to obtain the original data. As another example, key management system 157 may generate an asymmetric key including multiple keys (e.g., a public key and a private key). In such case, key management system 157 may encrypt original data with a first key of the keys (e.g., public key) to generate encrypted data and may decrypt the encrypted data with a second key of the keys (e.g., private key) to obtain the original data.

Key encryption keys may represent encryption keys that key management system 157 may use to encrypt other encryption keys. Key management system 157 may encrypt encryption keys using key encryption keys to generate encrypted keys. In some examples, key management system 157 may encrypt a portion or the entirety of an encryption key. For instance, key management system 157 may use a key encryption key to encrypt the private key, public key, or both of a public/private key pair of an asymmetric key.

In operation, data platform 150, or elements thereof (e.g., data protection manager 154, key rotation manager 156), may invoke encryption functions of key management system 157. For example, data protection manager 154 and/or key rotation manager 156 may invoke key management system 157 to generate encryption keys, key encryption keys, key data (e.g., random salts), and/or data encryption keys.

Data protection manager 154 may include key rotation manager 156 for rotating (e.g., replacing) key encryption keys that data protection manager 154 utilizes to encrypt data (e.g., chunks 164). For example, key rotation manager 156 may replace an existing key encryption key with another key encryption key. Once a key encryption key is replaced, data protection manager 154 may cease utilization of the replaced key encryption key and, instead, use the replacement key encryption key for encryption purposes.

Key management system 157 may use encryption keys and key data to derive (e.g., generate) data encryption keys and data protection manager 154 may use data encryption keys to encrypt and decrypt data, such as chunks 164 of backups 142. For instance, key management system 157 may generate a data encryption key using an encryption key and key data (e.g., a random salt) as input. Key management system 157 may generate a random number or random data to generate a unit of key data. As will be described further below, each individual unit of distinct key data must be obtained to decrypt chunks 164 and restore backup 142. In some examples, data protection manager 154 may protect backups 142 by encrypting each chunk 164 of backup 142 using the encryption key along with respective key data to generate a respective data encryption key used to encrypt each individual chunk 164. Each individual unit of key data may contain distinct data relative to other units of key data. For example, key management system 157, may generate first key data (e.g., a first random number) used to derive a first data encryption key and second key data (e.g., a second distinct random number) used to derive a second data encryption key. The first data encryption key may be used to encrypt and/or decrypt a first chunk of chunks 164 and the second data encryption key may be used to encrypt and/or decrypt a second chunk of chunks 164. In this manner, unauthorized access to key data for a particular chunk 164 does not allow decryption of other chunks 164.

Key management system 157 may generate or derive a data encryption key in various ways, such as by executing various key derivation functions. For example, key management system 157 may execute a hash-based key derivation function ("HKDF") to generate the data encryption key. For example, key management system 157 may execute the HKDF with the encryption key and key data as input to generate the data encryption key. Data protection manager 154 may encrypt data with the data encryption key to generate encrypted data. For example, data protection manager 154 may encrypt a chunk with the data encryption key to generate encrypted chunk 164.

Key management system 157 may protect (e.g., encrypt) encryption keys with a key encryption key. For example, key management system 157 may generate a first key encryption key, which may be referred to as a KMS key encryption key ("KMS KEK"), also referred to herein as a "system key," for encrypting encryption keys. Key management system 157 may encrypt an encryption key with the KMS KEK to generate an encrypted key. Continuing the above example for instance, key management system 157 may encrypt the encryption key used to derive the data encryption key. The encrypted key resulting from encrypting the encryption key must then be decrypted to obtain the encryption key thereby protecting the encryption key. Because the data encryption key is derived using the encryption key, the encrypted key prevents the data encryption key from being derived without first decrypting the encrypted key. Key management system 157 may store key encryption keys, including the KMS KEK, encrypted keys, or both in a storage device, such as enclave 132 and/or storage system 105 in some examples.

As described above, key rotation manager 156 may rotate key encryption keys. With regard to the above example for instance, key rotation manager 156 may rotate the KMS KEK by replacing the KMS KEK with another KMS KEK. For example, key rotation manager 156, such as through key management system 157, may generate a replacement KMS KEK and key rotation manager 156 may replace the existing KMS KEK with the replacement KMS KEK. The replaced key encryption key (e.g., the replaced KMS KEK) may be deprecated, deleted, or otherwise invalidated. Once replaced, data protection manager 154 may cease use of the replaced KMS KEK for encryption purposes and use the replacement KMS KEK to encrypt encryption keys.

For example, key rotation manager 156, such as through key management system 157 may encrypt the encryption key used to derive the data encryption key with the replacement KMS KEK rather than with the replaced KMS KEK. As part of replacing the existing KMS KEK, key rotation manager 156 may decrypt the encrypted key to obtain the encryption key and encrypt (e.g., re-encrypt) the encryption key with the replacement KMS KEK (rather than the replaced KMS KEK). In some examples, key rotation manager 156 may use the replaced KMS KEK to decrypt the encrypted key prior to encrypting the encryption key with the replacement KMS KEK.

Some systems may utilize a single data encryption key for data belonging to a particular tenant, partition, or workload. Such systems may encrypt the data encryption key such as using a key encryption key. The key encryption key may be replaced with a replacement key encryption key and the data encryption key may be re-encrypted with the replacement key encryption key by such systems. However, exposure of the data encryption key in these systems allows unauthorized parties to decrypt and exfiltrate all of the data encrypted with the data encryption key. Some systems may use an intermediary encryption key may be used to encrypt and protect the data encryption key in some cases. Such intermediary encryption key may be encrypted using the key encryption key as well. As such, when the key encryption key is replaced with the replacement key encryption key, the intermediary encryption key may be re-encrypted with the replacement key encryption key. However, similar to the foregoing system, exposure of an encryption key, in this case the intermediary encryption key, allows unauthorized parties to decrypt and exfiltrate all of the data encrypted using the intermediary encryption key.

In accordance with the techniques described herein, data protection manager 154 may utilize multiple encryption keys to enhance data security. For example, each of multiple encryption keys may be associated with different parties, compute/storage devices, or both to enhance security for encrypted data (e.g., chunks 164). For instance, a first encryption key may be assigned to a first party while a second encryption key may be assigned to a second party. Examples of such parties, include data owners, which may be enterprises or other users of application system 102, and data platform providers (e.g., a service provider providing data platform 150). By utilizing multiple encryption keys, a successful attack against parties, devices, or systems with one of the encryption keys does not allow data to be decrypted or exfiltrated.

For example, key management system 157 may generate a first encryption key and a second encryption key. Key management system 157 may encrypt the first encryption key and the second encryption key using the KMS KEK. To encrypt data, such as a chunk of backup 142, key management system 157 may derive a data encryption key. For example, key management system 157 may execute a key derivation function (e.g., HKDF) using the first encryption key and key data (e.g., a random salt) as input to generate the data encryption key. Data protection manager 154 may encrypt the data with the data encryption key. Data protection manager 154 may store the encrypted data, which may be in the form of encrypted chunk 164 of backup 142, such as to storage system 115.

Rather than using the same encryption key (e.g., the first encryption key), key management system 157 may encrypt the key data using the second encryption key to generate encrypted key data 166. As such, both the first encryption key and the key data, which together may be used to derive the data encryption key, are protected with encryption based on different encryption keys (e.g., the first encryption key and the second encryption key, respectively). In this manner, a successful attack against one encryption key (e.g., the first encryption key or the second encryption key) is insufficient to allow an unauthorized party to decrypt and/or exfiltrate encrypted chunk 164. In some examples, data protection manager 154 may store encrypted chunk 164 along with its respective encrypted key data 166 (e.g., the encrypted key data including the key data used to derive the data encryption key for encrypted chunk 164). As shown in the example of FIG. 1A for instance, data protection manager 154 stores encrypted chunk 164 along with corresponding encrypted key data 166, such as to storage system 115.

Key management system 157 may protect the first encryption key and the second encryption key with encryption. For example, key management system 157 may encrypt the first encryption key with the KMS KEK to generate a first encrypted key and encrypt the second encryption key with the KMS KEK to generate a second encrypted key. Key management system 157 may utilize the KMS KEK to encrypt and decrypt encryption keys. For example, key management system 157 may decrypt the first encrypted key with the KMS KEK to obtain the first encryption key and decrypt the second encrypted key with the KMS KEK to obtain the second encryption key.

In some examples, rather than storing encryption keys in unencrypted form, key management system 157 may only store encryption keys in the form of encrypted keys (e.g., the first encrypted key and the second encrypted key), such as to enclave 132, storage system 105, and/or storage system 115. For example, data protection manager 154 may store the first encrypted key to storage system 105 or storage system 115 and may store the second encrypted key in other storage, such as to enclave 132. Since enclave 132 is within the trusted execution environment of a confidential computing platform, enclave 132 may protect the second encrypted key, or other encrypted keys or encryption information using the trusted execution environment of enclave 132. For example, enclave 132 may seal encrypted keys, as well as other encryption information stored in enclave 132 using a sealing process of enclave's trusted execution environment.

Enclave 132 may store and seal encrypted keys, such as the second encrypted key, by "wrapping" and/or assigning particular platform measurements or characteristics to the encrypted keys, such as by encrypting encryption keys using the platform measurements or characteristics. Continuing this example, encrypted keys (e.g., the second encrypted key) may only be unsealed (e.g., "unwrapped") when the platform measurements or characteristics match those used to seal the key encryption keys. In this manner, sealed encrypted keys or other sealed encryption information (e.g., the KMS KEK) may not be decrypted for use when platform measurements or characteristics differ from those used to seal the key encryption keys.

To encrypt a chunk, data protection manager 154, such as through key management system 157, may generate or derive a data encryption key using the first encryption key and key data. For example, data protection manager 154 may execute a HKDF with the first encryption key and the key data as input to generate a data encryption key. In some examples, key management system 157 may generate distinct key data (e.g., a random salt) for each unit of data (e.g., chunk) to be encrypted. Data protection manager 154 may encrypt a chunk with the data encryption key to generate encrypted chunk 164.

As described above, the first encryption key may be protected by data protection manager 154 encrypting the first encryption key with the KMS KEK to generate the first encrypted key. Data protection manager 154 may obtain the first encryption key from the first encrypted key by decrypting the first encrypted key, such as with the KMS KEK. Data protection manager 154 may, in addition to protecting the first encryption key with encryption, protect the key data with encryption. For example, data protection manager 154 may encrypt the key data to generate encrypted key data 166. Data protection manager 154, such as through key management system 157, may encrypt the key data with the second encryption key to generate encrypted key data 166.

In some examples, data protection manager 154 may retrieve encrypted keys, encrypted chunks, and/or encrypted key data from various storage devices to which they are stored, including storage system 105, storage system 115, and/or enclave 132. For example, data protection manager 154 may retrieve the first encrypted key from storage system 105 or storage system 115 and retrieve the second encryption key from enclave 132. Data protection manager 154 may make retrieve data from enclave 132 by executing a function call to the trusted execution environment of enclave 132.

To decrypt encrypted chunk 164 stored in storage system 115, the key data used to encrypt chunk 164 is required. Continuing the above example for instance, the key data contained in encrypted key data 166 is required to generate the data encryption key for decrypting encrypted chunk 164. Data protection manager 154 may retrieve encrypted chunk 164 from storage system 115 along with encrypted key data 166 for the encrypted chunk 164. Data protection manager 154 may obtain the key data from encrypted key data 166 by decrypting, such as through key management system 157, encrypted key data 166.

In some examples, data protection manager 154 may obtain the key data from encrypted key data 166 through enclave 132. For example, data protection manager 154 may make a request to enclave 132 and enclave 132 may, in response, decrypt encrypted key data 166 to obtain the key data encoded in encrypted key data 166. Enclave 132 may retrieve encryption keys from storage within enclave itself or enclave's trusted execution environment and use the encryption keys to decrypt encrypted key data 166. For example, enclave 132 may retrieve the second encryption key from storage within enclave itself or enclave's trusted execution environment and decrypt encrypted key data 166 with the second encryption key to obtain the key data.

The second encryption key may be an asymmetric key in some examples. For example, the second encryption key may include a private key and a public key, such as a public/private key pair of a PKI. In such case, to encrypt the key data with the second encryption key, such as when encrypting chunk 164, data protection manager 154 may encrypt the key data with a public key of the second encryption key to generate encrypted key data 166. To decrypt encrypted key data 166 encrypted with the public key of the second encryption key, data protection manager 154 may decrypt encrypted key data 166 with the private key of the second encryption key. Where the second encryption key is an asymmetric key, key rotation manager 156 may encrypt the second encryption key by encrypting at least the private key (e.g., the private key or the private key and the public key) of the second encryption key with the KMS KEK to generate the second encrypted key.

Data protection manager 154 may derive the data encryption key to decrypt encrypted chunk 164 using the key data obtained from encrypted key data 166 and the first encryption key. For example, data protection manager 154 may generate the data encryption key by executing a key derivation function (e.g., HKDF) using the first encryption key and the key data from encrypted key data 166 as input. Data protection manager 154 may decrypt encrypted chunk 164 with the derived data encryption key. Data protection manager 154 may obtain the first encryption key from the first encrypted key by decrypting the first encrypted key, such as by using the KMS KEK.

As can be seen, the first encryption key and the second encryption key are both used during encryption and decryption of chunks 164 of backups 142. Key management system 157 protects the first encryption key and the second encryption key by encrypting the first encryption key and the second encryption key with the KMS KEK. As described above, key management system 157 may encrypt the first encryption key with the KMS KEK to generate a first encrypted key and may encrypt the second encryption key with the KMS KEK to generate a second encrypted key.

Key rotation manager 156 may mitigate or prevent security issues that arise from unauthorized access to the KMS KEK by rotating the KMS KEK. For example, a KMS KEK may be inadvertently leaked (e.g., accessed) without authorization, such as through system intrusion, misconfiguration, or privilege misuse. Key rotation manager 156 may replace the compromised KMS KEK with a replacement KMS KEK to prevent further use of the compromised KMS KEK. Key rotation manager 157 may, such as through key management system 157, encrypt encryption keys (e.g., the first encryption key and the second encryption key) with the replacement KMS KEK to prevent access to the encryption keys using the compromised KMS KEK. As can be seen, rather than performing O(n) re-encryptions, such as to re-encrypt data encryption keys for n chunks 164, key rotation manager 156 may re-encrypt the first encryption key and the second encryption key when replacing the KMS KEK, which may be performed in O(1) or constant time.

As such, key rotation manager 156 may protect data (e.g., chunks 164 of backups 142) by efficiently and securely rotating key encryption keys used to encrypt the encryption keys used to encrypt the data. As described herein, key rotation manager 156 may provide efficient and secure key rotation for various data, including encrypted chunks 164 where respective EDEKs (e.g., encrypted key data) are stored along with each encrypted chunk. In accordance with the described techniques, key rotation manager 156 may perform in constant time (e.g., O(1)) rather than perform O(n) re-encryptions in connection with key rotation. Through use of multiple encrypted keys and the encryption thereof based on rotated KMS KEKs, data protection manager 154 avoids re-encrypting previously stored backup data (e.g., previously stored encrypted chunks 164) in connection with key rotation.

By performing key rotation more efficiently (e.g., O(1) versus O(n) re-encryptions) and without high consumption of computing resources even when there is a very large amount of encrypted backup data, key rotation manager 156 improves data security. Key rotation manager 156 may perform key rotation to mitigate and/or prevent security issues relating to unintended or unauthorized use of encryption information such as encryption keys, key encryption keys, data encryption keys, and key data (e.g., unauthorized data access/exfiltration, privilege misuse). The constant time efficiency of the key rotation performed by key rotation manager 156 reduces system load and/or system downtime and permits key rotation to be performed more frequently to further mitigate and/or prevent security issues relating to unintended or undesired leaks of such encryption information. The security improvements result in reduced use of computing resources by preventing exfiltration of large amounts of data (e.g., gigabytes or terabytes of data) which, in itself, presents a security risk and consumes significant computing resources.

System 190 of FIG. 1B is a variation of system 100 of FIG. 1A in that data platform 150 may store backups 142 using chunkfiles 162 stored on backup storage system 115 that is on premises or local to data platform 150. In some examples of system 190, storage system 115 enables users or applications to create, modify, or delete chunkfiles 162 via file system manager 152. In system 190, storage system 105 of FIG. 1B may be a primary storage system 105 used by system 190 or data platform 150 for initially storing and accumulating chunks 164 prior to backup to storage system 115. Though not shown, in some examples, storage system 105 may be on premises or local to data platform 150, regardless of whether or not storage system 115 is remote or local to data platform 150.

Figure 2:
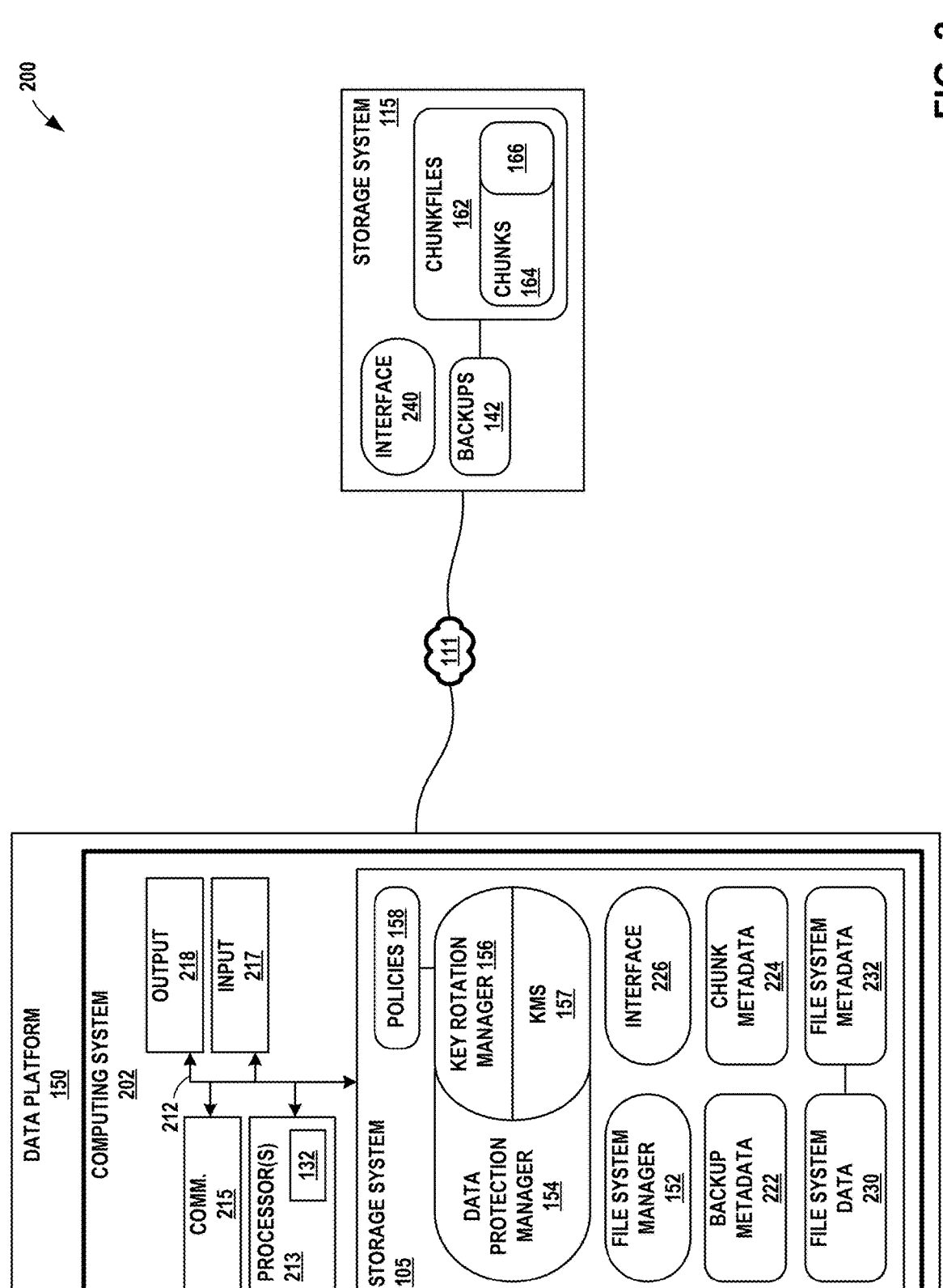
FIG. 2 is a block diagram illustrating example system that performs efficient and secure key rotation for backup storage, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to a local storage system 115). One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one storage system 115 is depicted, data platform 150 may apply techniques in accordance with this disclosure using multiple instances of storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of a local storage system 105. Local storage system 105 may include various elements. For example, local storage system 105 may include interface module 226, file system manager 152, and policies 158 as well as data protection manager 154, key rotation manager 156, and key management system 157. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more processors 213 may include one or more enclaves 132. In some examples, enclave 132 may comprise processing circuitry, memory, or both that is isolated from the remaining hardware of processor 213. For instance, enclave 132 may comprise physically isolated processing circuitry, memory or both with processor 213 that constitutes a trusted execution environment of a confidential computing platform.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees that describe objects within file system 153 and the file system 153 hierarchy, and can be used to write or retrieve objects within file system 153. File system manager 152 may interact with and/or operate in conjunction with one or more modules of computing system 202, including interface module 226 and data protection manager 154.

Data protection manager 154, key rotation manager 156, and key management system 157 may perform backup functions relating to storing and protecting backups 142 of file system 153, as described above with respect to FIG. 1A, including the operations described above with respect to rotating key encryption keys and encrypting and decrypting chunks 164. Data protection manager 154 may generate one or more backups 142 and cause file system data 230 to be stored as chunks 164 within chunkfiles 162 in backup storage system 115. Data protection manager 154 may apply an adaptive deduplication process to selectively deduplicate chunks of objects within file system data 230, in accordance with one or more policies 158. Data protection manager 154 may generate and manage chunk metadata 224 for generating, viewing, retrieving, or restoring any of backups 142. Backup metadata 222 may include respective original data lock periods for backups 142. Data protection manager 154 may generate and manage chunk metadata 224 for generating, viewing, retrieving, or restoring objects stored as chunks 164 (and references thereto) within chunkfiles 162, for any of backups 142. Stored objects may be represented and manipulated using logical files for identifying chunks for the objects.

Local storage system 105 may store chunk metadata 224 including a chunk table that describes chunks 164. The chunk table may include respective chunk IDs for chunks 164 and may contain pointers to chunkfiles 162 and offsets within chunkfiles 162 for retrieving chunks 164 from one or more storage systems 115 of one or more cloud environments 130. Chunks 164 are written into chunkfiles 162 at different offsets. By comparing new chunk IDs to the chunk table, data protection manager 154 can determine if the data already exists on the system. Data protection manager 154 may use the chunk table to look up the chunkfile identifier for the chunkfile that contains a chunk.

Local storage system 105 may include a chunkfile table that describes respective physical or virtual locations of chunkfiles 162 on storage system 115, along with other metadata about the chunkfile, such as a checksum, encryption data, compression data, etc. For example, in FIG. 2, data protection manager 154 may cause chunk metadata 224 including a chunkfile table to be stored to local storage system 105. Data protection manager 154, optionally or in conjunction with file system manager 152, may use chunk metadata 224 to restore any of backups 142 to a file system implemented by data platform 150, which may be presented by file system manager 152 to other systems.

Interface module 226 may execute an interface by which other systems or devices may determine operations of file system manager 152 or data protection manager 154. Another system or device may communicate via an interface of interface module 226 to specify one or more policies 158.

System 200 may be modified to implement an example of system 190 of FIG. 1B. In the modified system 200, chunkfiles 162 are stored to a local backup storage system 115 to support backups 142.

Interface module 240 of backup storage system 115 may execute an interface by which other systems or devices may create, modify, delete, or extend a WORM lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Figure 3A:
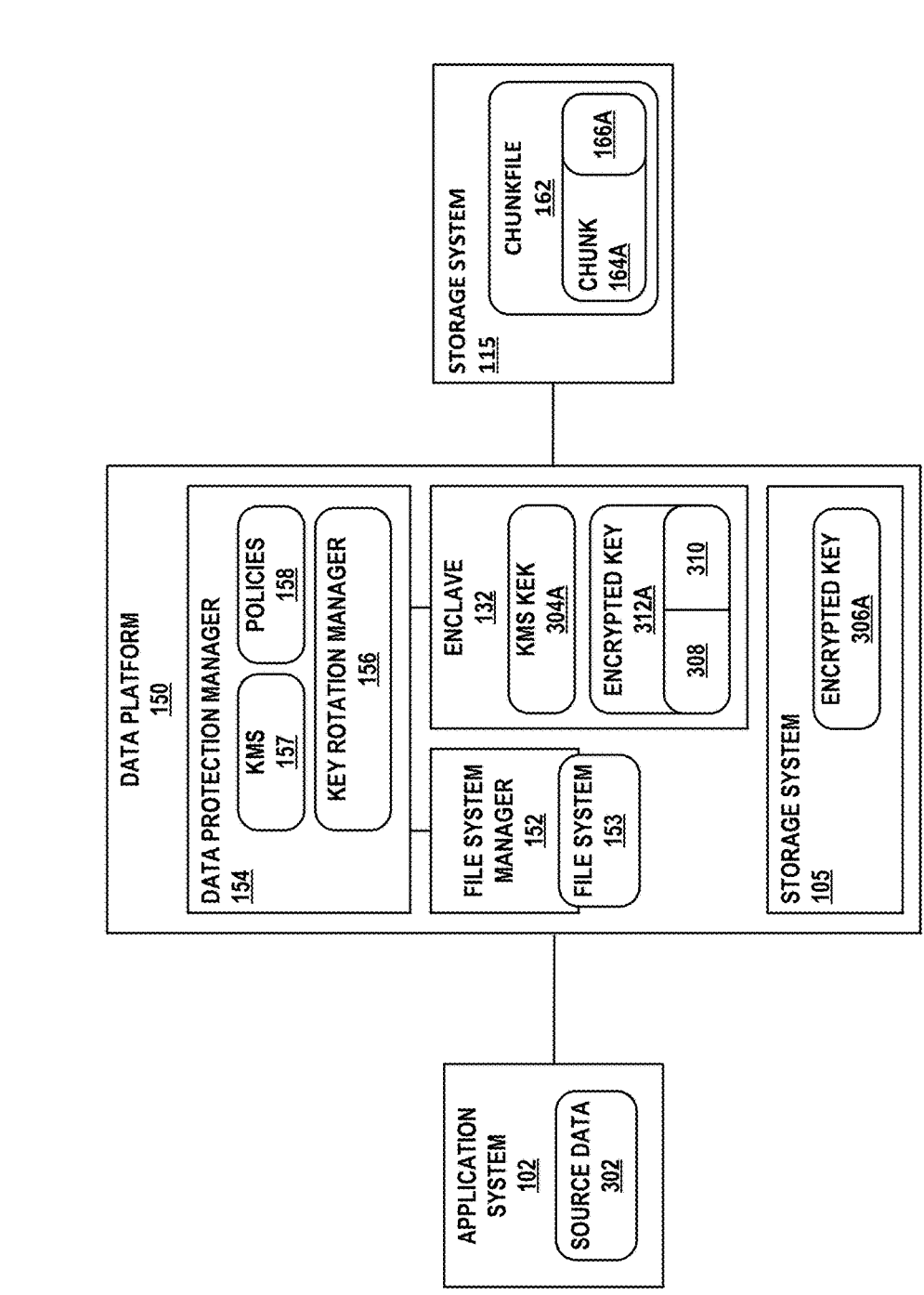
FIGS. 3A-3B are block diagrams illustrating example systems performing efficient and secure key rotation for backup storage, in accordance with the techniques of this disclosure.
Figure 3B:
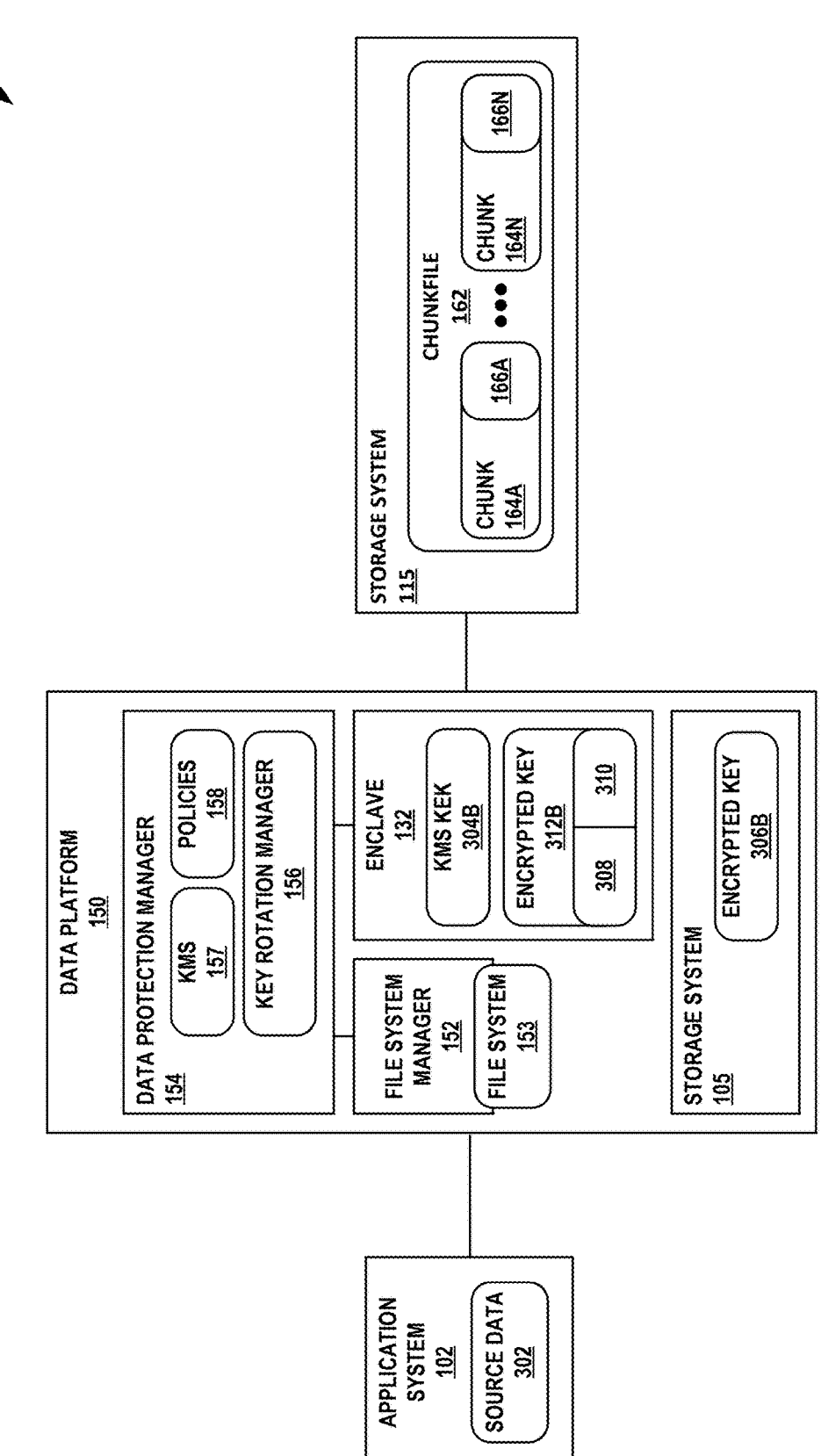

FIGS. 3A-3B are block diagrams illustrating example systems performing efficient and secure key rotation for backup storage, in accordance with the techniques of this disclosure. System 300 of FIGS. 3A-3B may be described as an example or alternate implementation of system 100 of FIG. 1A or system 190 of FIG. 1B (where chunkfiles 162 are written to a local storage system 115). One or more aspects of FIGS. 3A-3B may be described herein within the context of FIGS. 1A-1B. For example, application system 102, data platform 150, and storage system 115 of FIGS. 3A-3C may correspond to application system 102, data platform 150, and storage system 115 of FIGS. 1A-1B.

Initialization or setup of data platform 150 will now be described with respect to the example of FIG. 3A. During initialization, data platform 150 may prepare storage system 115 to store encrypted chunks 164. For example, data platform 150 may create storage system 115 through a cloud storage provider or other public or private cloud service. Data platform 150 may obtain one or more addresses (e.g., URL(s)) from storage system 115 through which data can be read or written at storage system 115.

Data platform 150 may generate one or more encryption keys and one or more key encryption keys for encrypting the encryption keys. For example, data platform 150, may generate a KMS KEK 304A and may store KMS KEK 304A to a suitable storage device, such as to enclave 132 or storage system 105. Data platform 150 may use KMS KEK 304A to encrypt encryption keys used to encrypt one or more chunks, such as chunk 164A. As described above, data platform 150 may utilize multiple encryption keys when encrypting chunks 164. In this manner, unauthorized access to one encryption key is insufficient to decrypt and/or exfiltrate data (e.g., chunks 164) of a backup.

For example, data platform 150 may generate multiple encryption keys by generating a first encryption key and a second encryption key. Data platform 150 may use KMS KEK 304A to encrypt the first encryption key to generate first encrypted key 306A and use KMS KEK 304A to encrypt the second encryption key to generate second encrypted key 312A. Data platform 150 may store first encrypted key 306A and second encrypted key 312A to one or more suitable storage devices. For example, data protection manager 154 of data platform 150 may store first encrypted key 306A to storage system 105 and store second encrypted key 312A to enclave 132. Though shown and described as being stored to particular storage devices, first encrypted key 312A and second encrypted key 312B may be stored to various combinations of the same or different storage devices. To illustrate, in some examples, data platform 150 may store first encrypted key 106A to storage system 115 and store second encrypted key 312A to enclave 132, or data platform 150 may store both first encrypted key 306A and second encrypted key 312A to the same storage device (e.g., enclave 132).

As described above, encryption keys may be various types of encryption keys. For example, the first encryption key may be a symmetric encryption key and the second encryption key may be an asymmetric encryption key. As shown in the example of FIG. 3A for instance, the second encryption key comprises an asymmetric key including a private key 308 and a public key 310. In some examples, to encrypt asymmetric encryption keys, such as the second encryption key, data platform 150 may encrypt the entirety or a portion of an asymmetric encryption key. For instance, data platform 150 may encrypt, with KMS KEK 304A, only private key 308 of the second encryption key or both private key 308 and public key 310 of the second encryption key to generate second encrypted key 312A.

After initialization, data platform 150 may store data (e.g., encrypted chunks 164), such as to storage system 115. For example, data platform 150 may store one or more encrypted chunks 164 to backup source data 302 received from a source system, such as application system 102. Application system 102, chunks 164 and chunkfile 162 of FIGS. 3A-3B may be examples of application system 102, chunks 164, and chunkfile 162 of FIGS. 1A-1B. Though not shown encrypted chunks 164 may constitute one or more backups such as backups 142 of FIGS. 1A-1B.

Data platform 150 may generate one or more raw (e.g., unencrypted) chunks from source data 302, such as described above. For example, data platform 150 may generate raw chunks comprising 16-48 kB portions of source data 302. Data platform 150 may encrypt a raw chunk using a data encryption key generated from the first encryption key and key data to generate encrypted chunk 164. For example, data platform 150 may generate the data encryption key by applying a key derivation function (e.g., HKDF) using the first encryption key and the key data as input. Data platform 150 may obtain the first encryption key by decrypting first encrypted key 306A, such as with KMS KEK 304A.

Data platform 150 may generate the key data, such as by generating a random number or random data. In some examples, data platform 150 may generate distinct key data (e.g., a random salt) for each encrypted chunk 164. In this manner, the key data for a particular encrypted chunk 164 cannot be used by unauthorized parties to decrypt other encrypted chunks 164. After generating encrypted chunk 164, data platform 150 may store encrypted chunk 164 along with corresponding encrypted key data 166. As shown in the example of FIG. 3A for instance, data platform 150 stores encrypted chunk 164A along with corresponding encrypted key data 166A, containing the key data used to derive the data encryption key used to encrypt encrypted chunk 164A, to storage system 115.

Data platform 150 may generate encrypted key data 166A by encrypting the key data used to derive the data encryption key used to encrypt chunk 164A. Data platform 150 may encrypt key data with a different encryption key that that used to derive the data encryption key. For example, data platform 150 may encrypt the key data with the second encryption key, rather than the first encryption, such as with public key 310 of the second encryption key. In this manner, possession of one of the first encryption key or the second encryption key is insufficient for an unauthorized party to decrypt encrypted chunks 164. Data platform 150 may obtain the second encryption key, including public key 310 thereof, by decrypting second encrypted key 312A.

For decryption purposes, data platform 150 may obtain the key data encoded within encrypted key data 166A and use the key data from encrypted key data 166A to generate the data encryption key capable of decrypting encrypted chunk 164A. In some examples, data platform 150 may use enclave to obtain key data from encrypted key data 166A. For instance, data platform 150 may send encrypted key data 166A to enclave 132, such as via a secure session with enclave 132, for decryption. Enclave 132 may decrypt encrypted key data 166A with the second encryption key, such as private key 308 of second encrypted key 312A. Enclave 132 may obtain private key 308 by decrypting second encrypted key 312A, such as with KMS KEK 304A.

After decryption of encrypted key data 166A, enclave 134 may send the key data obtained by decrypting encrypted key data 166A to another element (e.g., data protection manager 154) of data platform 150. Data platform 150 may derive the data encryption key with the key data. For example, to generate the data encryption key to decrypt encrypted chunk 164A, data platform 150 may execute a key derivation function (e.g., HKDF) using the first encryption key obtained from first encrypted key 306A and the key data obtained from encrypted key data 166A as input. Data platform may obtain the first encryption key by decrypting first encrypted key 306A, such as with KMS KEK 304A. As can be seen, the data encryption key used to decrypt encrypted chunk 164A may be identical to or otherwise correspond to the data encryption key used to encrypt chunk 164A. To illustrate, the data encryption key used to decrypt encrypted chunk 164A may be derived from the same input as that used to derive the data encryption key used to encrypt chunk 164A.

Data platform 150 may decrypt encrypted chunk 164 using the data encryption key. Data platform 150 may use the decrypted data from encrypted chunk 164 to restore a backup. For example, data platform 150 may store the decrypted data from encrypted chunk 164, such as to storage system 105, to restore chunk 164A at storage system 105.

Referring to FIG. 3B, data platform 150, such as through key rotation manager 156, may rotate one or more key encryption keys. Data platform 150 may generate KMS KEK 304B as a replacement to KMS KEK 304A of FIG. 3A. As shown by the example of FIG. 3B, data platform 150 may replace KMS KEK 304A of FIG. 3A with KMS KEK 304B of FIG. 3B. As such, KMS KEK 304A may be considered a replaced KMS KEK and KMS KEK 304B may be considered a replacement KMS KEK. After KMS KEK 304A is replaced, data platform 150 discontinues use of KMS KEK 304A thereby deprecating or invalidating KMS KEK 304A.

Data platform 150 may re-encrypt first encryption key and second encryption key with the replacement KMS KEK (e.g., KMS KEK 304B) to respectively generate first encrypted key 306B and second encrypted key 312B. For example, data platform 150 may decrypt first encrypted key 306A and second encrypted key 312A of FIG. 3A to respectively obtain first encryption key and second encryption key. Data platform 150 may "re-encrypt" first encryption key and second encryption key with a replacement KMS KEK (e.g., KMS KEK 304B) to generate first encrypted key 306B and second encrypted key 312B of FIG. 3B. Data platform 150 may replace first encrypted key 306A and second encrypted key 312A of FIG. 3A with first encrypted key 306B and second encrypted key 312B of FIG. 3B, respectively. In this manner, data platform 150 deprecates or invalidates first encrypted key 306A and second encrypted key 312A.

As can be seen by encrypted chunk 164N of FIG. 3B, data platform 150 may encrypt additional chunks using first encrypted key 306B and second encrypted key 312B of FIG. 3B, as described above with respect to encrypting encrypted chunk 164A with first encrypted key 306A and second encrypted key 312A of FIG. 3A. Data platform 150 may decrypt encrypted chunks 164A-164N (collectively, "chunks 164") using first encrypted key 306B and second encrypted key 312 of FIG. 3B, as described above with respect to encrypting encrypted chunk 164A with first encrypted key 306A and second encrypted key 312A of FIG. 3A.

For example, to generate encrypted chunk 164N, data platform 150 may encrypt another raw chunk of source data 302 using a data encryption key generated from the first encryption key and key data. As described above, data platform 150 may generate the data encryption key by applying a key derivation function (e.g., HKDF) using the first encryption key and the key data as input. In this example, data platform 150 may obtain the first encryption key by decrypting first encrypted key 306B, rather than first encrypted key 306A, such as with KMS KEK 304B. Data platform 150 may generate the key data, such as by generating a random number or random data. After generating encrypted chunk 164N, data platform 150 may store encrypted chunk 164N along with corresponding encrypted key data 166N.

Data platform 150 may generate encrypted key data 166N by encrypting the key data used to derive the data encryption key used to encrypt chunk 164N. As described above with respect to FIG. 3A, data platform 150 may encrypt key data with a different encryption key that that used to derive the data encryption key. For example, data platform 150 may encrypt the key data with the second encryption key, such as public key 310 thereof, rather than the first encryption key. In this manner, possession of one of the first encryption key or the second encryption key remains insufficient for an unauthorized party to decrypt encrypted chunks 164. Data platform 150 may obtain the second encryption key, including public key 310 thereof, by decrypting second encrypted key 312B, such as with KMS KEK 304B.

To decrypt encrypted chunk 164N, data platform 150 may obtain the key data encoded within encrypted key data 166N. For example, data platform 150 may send encrypted key data 166N to enclave 132, such as via a secure session with enclave 132, for decryption. Enclave 132 may decrypt encrypted key data 166N with the second encryption key, such as private key 308 of second encrypted key 312B. Enclave 132 may obtain private key 308 by decrypting second encrypted key 312B, such as with KMS KEK 304B. Data platform 150 may derive the data encryption key with the key data decrypted by and received from enclave 132. For example, to derive the data encryption key to decrypt encrypted chunk 164N, data platform 150 may execute a key derivation function (e.g., HKDF) using the first encryption key and the key data as input. Data platform may obtain the first encryption key by decrypting first encrypted key 306B, such as with KMS KEK 304B.

Data platform 150 may decrypt any of encrypted chunks 164A-164N with replacement KMS KEK 304B, first encrypted key 306B, and second encrypted key 312B. For example, to decrypt chunk 164A of FIG. 3A (also shown in FIG. 3B), data platform 150 may obtain the first encryption key and the second encryption key by respectfully decrypting first encrypted key 306B and second encrypted key 312B, such as with KMS KEK 304B. Data platform 150 may decrypt encrypted key data 166A of chunk 164A with the second encryption key, such as private key 310 thereof, to obtain the key data of encrypted key data 166A. As stated, decryption of encrypted key data 166A may be performed by enclave 132. Data platform 150 may derive the data encryption key to decrypt chunk 164A through a key derivation function (e.g., HKDF) with the key data obtained from encrypted key data 166A and the first encryption key. Data platform 150 may use the data encryption key to decrypt encrypted chunk 164A.

Through rotation of KMS KEK 304 (e.g., replacing KMS KEK 304A with KMS KEK 304B), key rotation manager 156 of data platform 150 deprecates or invalidates KMS KEK 304A, replaces first encrypted key 306A with first encrypted key 306B, and replaces second encrypted key 312A with second encrypted key 312B. As described above, KMS KEK 304 may be used both to encrypt and decrypt first encrypted keys 306 and second encrypted keys 312. As such, by deprecating or invalidating KMS KEK 304A, data platform 150 prevents first encrypted key 306A and second encrypted key 312A, encrypted with KMS KEK 304A, from being decrypted. By replacing first encrypted key 306A and second encrypted key 312A respectively with first encrypted key 306B and second encrypted key 312B, data platform 150 ensures the first encryption key and the second encryption key cannot be obtained using KMS KEK 304A. Likewise, when data platform 150 deprecates or invalidates KMS KEK 304B, such as by replacing KMS KEK 306B with another replacement KMS KEK, data platform 150 prevents first encryption key 306B and second encryption key 312B from being used for encryption purposes (e.g., encryption and/or decryption of encrypted chunks 164).

FIG. 4 is a flowchart illustrating an example mode of operation for a data platform to perform efficient and secure key rotation for backup storage, in accordance with techniques of this disclosure. FIG. 4 is described in the context of FIGS. 3A-3B. As shown in the example of FIG. 4, data platform 150 may generate a first encrypted key 306A and a second encrypted key 312A (402). Data platform 150 may generate first encrypted key 306A by encrypting a first encryption key with a first system key 304A and generate second encrypted key 312A by encrypting a second encryption key with first system key 304A. As set forth above, KMS KEK 304 may also be referred to herein as "system key 304."

Data platform 150 may store one or more encrypted chunks 164 with each encrypted chunk 164 being encrypted, by data platform 150, with a data encryption key derived from the first encryption key of first encrypted key 306A and key data of encrypted key data 166A. Encrypted key data 166A may be encrypted, by data platform 150, with the second encryption key from second encrypted key 312A. Data platform 150 may store each encrypted chunk of one or more encrypted chunks 164 along with respective encrypted key data 166. As shown in FIG. 3B for example, encrypted chunk 164A is stored with encrypted key data 166A and encrypted chunk 165N is stored with encrypted key data 166N. One or more encrypted chunks 164 may be part of a backup, archive, or snapshot of data of the one or more encrypted chunks, (e.g., source data from one or more workloads 174 of application system 102). In some examples, one or more encrypted chunks 164 may be part of WORM storage for the data of the one or more encrypted chunks, the WORM storage comprising one or more of a backup, archive, or snapshot Data platform 150 may generate an asymmetric key pair comprising a private key 308 and a public key 310 for use as the second encryption key. The second encryption key may be public key 308 of the asymmetric key pair. As such, in some examples, to decrypt the encrypted key data 166A to obtain the key data, data platform 150 may decrypt encrypted key data 166A with private key 308. Data platform 150 may obtain the second encryption key, including any private key 308 and/or public key 310 thereof, by decrypting second encrypted key 306A, such as with first system key 304A.

To perform key rotation, data platform 150 may replace first system key 304A by determining a second system key 304B (404). For example, data platform 150 may determine second system key 304B by generating a key encryption key for use as second system key 304B. In some examples, data platform 150 may replace first system key 304A by determining second system key 304B in response to a key rotation event. The key rotation event may be various events, such as expiration of a key rotation time period (e.g., 5 minutes, 10 minutes), detection of unauthorized access, or receipt of a user input to rotate a system key. In this manner, data platform 150 may perform key rotation in response to various events. For example, data platform 150 may rotate first system key 304A periodically (e.g., every 5 minutes) or in response to the user input to rotate first system key 304A. Data platform 150 may receive the user input, such as through input device 217 as shown in FIG. 2. Data platform 150 may, in some examples, include an intrusion detection system. In these examples, data platform 150 may rotate first system key 304A in response to the intrusion detection system detecting an unauthorized access to data platform 150 or one or more elements thereof (e.g., data protection manager 154, storage system 105, storage system 115, application system 102).

Data platform 150 may encrypt, with second system key 304B, the first encryption key to generate a replacement first encrypted key 306B and the second encryption key to generate a replacement second encrypted key 312B (406). To encrypt data (e.g., one or more chunks), data platform 150 may decrypt the replacement first encrypted key 306B to obtain the first encryption key and encrypted key data 166A to obtain the key data (408). Data platform 150 may decrypt first encrypted key 306B, such as with second system key 304B. and may decrypt encrypted key data 166A with the second encryption key. Data platform 150 may obtain the second encryption key by decrypting second encrypted key 312B, such as with second system key 304B. The first encryption key and the key data may be used, by data platform 150, to derive the data encryption key when decrypting one or more encrypted chunks 164A. Data platform 150 may output data from one or more encrypted chunks 164A by decrypting one or more encrypted chunks 164A with the data encryption key (410).

One or more encrypted chunks 164A may be considered to be one or more first encrypted chunks 164A and encrypted key data 166A may be considered to be first encrypted key data 166A. As such, data platform 150 may encrypt one or more chunks (e.g., raw chunks of source data 302) to generate one or more second encrypted chunks 164N. Each encrypted chunk of one or more second encrypted chunks 164N may be encrypted, by data platform 150, with a data encryption key derived from the first encryption key of the replacement first encrypted key 306B and the key data of second encrypted key data 166N. Data platform 150 may store each encrypted chunk of one or more second encrypted chunks 164N, along with the second encrypted key data 166N.

The second encrypted key data 166N may be encrypted, by data platform 150, with the second encryption key of the replacement second encrypted key 312B. Data platform may accordingly obtain the second encryption key by decrypting replacement second encrypted key 312B, such as with second system key 304B. Data platform 150 may obtain the first encryption key from replacement first encrypted key 306B by decrypting replacement first encrypted key 306B, such as with second system key 304B.

Although the techniques described in this disclosure are primarily described with respect to a backup function performed by a key rotation manager of a data platform, similar techniques may additionally or alternatively be applied for an archive, replica, clone, or snapshot function performed by the data platform. In such cases, backups 142 would be archives, replicas, clones, or snapshots, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

In this way, various aspects of the techniques may enable the following examples.

Example 1: A method includes generating, by a data platform implemented by a computing system, a first encrypted key and a second encrypted key, wherein the data platform stores one or more encrypted chunks, each encrypted chunk of the one or more encrypted chunks encrypted with a data encryption key derived from a first encryption key of the first encrypted key and key data of encrypted key data, the first encrypted key data encrypted with a second encryption key from the second encrypted key, the first encrypted key and the second encrypted key encrypted with a first system key; replacing, by the data platform, the first system key by determining a second system key; encrypting, by the data platform and with the second system key, the first encryption key to generate a replacement first encrypted key and the second encryption key to generate a replacement second encrypted key; decrypting, by the data platform, the replacement first encrypted key to obtain the first encryption key and the encrypted key data to obtain the key data, wherein the first encryption key and the key data are used derive the data encryption key when decrypting the one or more encrypted chunks; and outputting, by the data platform, data from the one or more encrypted chunks by decrypting the one or more encrypted chunks with the data encryption key.

Example 2: The method of example 1, wherein the one or more encrypted chunks are one or more first encrypted chunks and the encrypted key data is first encrypted key data, the method further includes encrypting, by the data platform, one or more chunks to generate one or more second encrypted chunks, each encrypted chunk of the one or more second encrypted chunks encrypted with a data encryption key derived from the first encryption key of the replacement first encrypted key and key data of second encrypted key data, the second encrypted key data encrypted with the second encryption key of the replacement second encrypted key.

Example 3: The method of example 2, further comprising storing, by the data platform, each encrypted chunk of the one or more second encrypted chunks, along with the second encrypted key data.

Example 4: The method of any of examples 1 through 3, wherein the data platform stores each encrypted chunk of the one or more encrypted chunks along with the encrypted key data.

Example 5: The method of any of examples 1 through 4, further comprising generating an asymmetric key pair comprising a public key and a private key, wherein the second encryption key is the public key of the asymmetric key pair.

Example 6: The method of example 5, wherein decrypting the encrypted key data to obtain the key data comprises decrypting, by the data platform, the encrypted key data with the private key.

Example 7: The method of any of examples 1 through 6, wherein the one or more encrypted chunks are part of write once, read many (WORM) storage for the data of the one or more encrypted chunks, the WORM storage comprising one or more of a backup, archive, or snapshot.

Example 8: The method of any of examples 1 through 7, wherein replacing the first system key by determining the second system key is responsive to a key rotation event, the key rotation event comprising one or more of expiration of a key rotation time period, detection of unauthorized access, or receipt of a user input to rotate a system key.

Example 9: A computing system includes a memory storing instructions; and processing circuitry that executes the instructions to: generate a first encrypted key and a second encrypted key, wherein the data platform stores one or more encrypted chunks, each encrypted chunk of the one or more encrypted chunks encrypted with a data encryption key derived from a first encryption key of the first encrypted key and key data of encrypted key data, the first encrypted key data encrypted with a second encryption key from the second encrypted key, the first encrypted key and the second encrypted key encrypted with a first system key; replace the first system key by determining a second system key; encrypt, with the second system key, the first encryption key to generate a replacement first encrypted key and the second encryption key to generate a replacement second encrypted key; decrypt the replacement first encrypted key to obtain the first encryption key and the encrypted key data to obtain the key data, wherein the first encryption key and the key data are used derive the data encryption key when decrypting the one or more encrypted chunks; and output data from the one or more encrypted chunks by decrypting the one or more encrypted chunks with the data encryption key.

Example 10: The computing system of example 9, wherein the one or more encrypted chunks are one or more first encrypted chunks and the encrypted key data is first encrypted key data, and the processing circuitry further executes the instructions to: encrypt one or more chunks to generate one or more second encrypted chunks, each encrypted chunk of the one or more second encrypted chunks encrypted with a data encryption key derived from the first encryption key of the replacement first encrypted key and key data of second encrypted key data, the second encrypted key data encrypted with the second encryption key of the replacement second encrypted key.

Example 11: The computing system of example 10, wherein the processing circuitry further executes the instructions to store each encrypted chunk of the one or more second encrypted chunks, along with the second encrypted key data.

Example 12: The computing system of any of examples 9 through 11, wherein the data platform stores each encrypted chunk of the one or more encrypted chunks along with the encrypted key data.

Example 13: The computing system of any of examples 9 through 12, wherein the processing circuitry further executes the instructions to generate an asymmetric key pair comprising a public key and a private key, wherein the second encryption key is the public key of the asymmetric key pair.

Example 14: The computing system of example 13, wherein to decrypt the encrypted key data to obtain the key data the processing circuitry further executes the instructions to decrypt the encrypted key data with the private key.

Example 15: The computing system of any of examples 9 through 14, wherein the one or more encrypted chunks are part of write once, read many (WORM) storage for the data of the one or more encrypted chunks, the WORM storage comprising one or more of a backup, archive, or snapshot.

Example 16: The computing system of any of examples 9 through 15, wherein the processing circuitry further executes the instructions to replace the first system key by determining the second system key responsive to a key rotation event, the key rotation event comprising one or more of expiration of a key rotation time period, detection of unauthorized access, or receipt of a user input to rotate a system key.

Example 17: A computer-readable storage medium includes instructions that, when executed, cause processing circuitry of a computing system to: generate a first encrypted key and a second encrypted key, wherein the data platform stores one or more encrypted chunks, each encrypted chunk of the one or more encrypted chunks encrypted with a data encryption key derived from a first encryption key of the first encrypted key and key data of encrypted key data, the first encrypted key data encrypted with a second encryption key from the second encrypted key, the first encrypted key and the second encrypted key encrypted with a first system key; replace the first system key by determining a second system key; encrypt, with the second system key, the first encryption key to generate a replacement first encrypted key and the second encryption key to generate a replacement second encrypted key; decrypt the replacement first encrypted key to obtain the first encryption key and the encrypted key data to obtain the key data, wherein the first encryption key and the key data are used derive the data encryption key when decrypting the one or more encrypted chunks; and output data from the one or more encrypted chunks by decrypting the one or more encrypted chunks with the data encryption key.

Example 18: The computer-readable storage medium of example 17, wherein the one or more encrypted chunks are one or more first encrypted chunks and the encrypted key data is first encrypted key data, and the instructions, when executed, cause processing circuitry of a computing system to: encrypt one or more chunks to generate one or more second encrypted chunks, each encrypted chunk of the one or more second encrypted chunks encrypted with a data encryption key derived from the first encryption key of the replacement first encrypted key and key data of second encrypted key data, the second encrypted key data encrypted with the second encryption key of the replacement second encrypted key.

Example 19: The computer-readable storage medium of any of examples 17 and 18, wherein the one or more encrypted chunks are part of write once, read many (WORM) storage for the data of the one or more encrypted chunks, the WORM storage comprising one or more of a backup, archive, or snapshot.

Example 20: The computer-readable storage medium of any of examples 17 through 19, wherein the instructions, when executed, cause processing circuitry of a computing system to replace the first system key by determining the second system key responsive to a key rotation event, the key rotation event comprising one or more of expiration of a key rotation time period, detection of unauthorized access, or receipt of a user input to rotate a system key.

Various examples of the disclosure have been described. Any combination of the described systems, operations, or functions is contemplated.

The invention claimed is:

1. A method comprising:

generating, by a data platform implemented by a computing system, a first encrypted key and a second encrypted key, wherein the data platform stores one or more encrypted chunks, each encrypted chunk of the one or more encrypted chunks encrypted with a data encryption key derived from a first encryption key of the first encrypted key and key data of first encrypted key data, the first encrypted key data encrypted with a second encryption key from the second encrypted key, the first encrypted key and the second encrypted key encrypted with a first system key;

replacing, by the data platform, the first system key by determining a second system key;

encrypting, by the data platform and with the second system key, the first encryption key to generate a replacement first encrypted key and the second encryption key to generate a replacement second encrypted key;

decrypting, by the data platform, the replacement first encrypted key to obtain the first encryption key and the encrypted key data to obtain the key data, wherein the first encryption key and the key data are used derive the data encryption key when decrypting the one or more encrypted chunks; and outputting, by the data platform, data from the one or more encrypted chunks by decrypting the one or more encrypted chunks with the data encryption key.

2. The method of claim 1, wherein the one or more encrypted chunks are one or more first encrypted chunks and the encrypted key data is first encrypted key data, the method further comprising:

encrypting, by the data platform, one or more chunks to generate one or more second encrypted chunks, each encrypted chunk of the one or more second encrypted chunks encrypted with a data encryption key derived from the first encryption key of the replacement first encrypted key and key data of second encrypted key data, the second encrypted key data encrypted with the second encryption key of the replacement second encrypted key.

3. The method of claim 2, further comprising storing, by the data platform, each encrypted chunk of the one or more second encrypted chunks, along with the second encrypted key data.

4. The method of claim 1, wherein the data platform stores each encrypted chunk of the one or more encrypted chunks along with the encrypted key data.

5. The method of claim 1, further comprising generating an asymmetric key pair comprising a public key and a private key, wherein the second encryption key is the public key of the asymmetric key pair.

6. The method of claim 5, wherein decrypting the encrypted key data to obtain the key data comprises decrypting, by the data platform, the encrypted key data with the private key.

7. The method of claim 1, wherein the one or more encrypted chunks are part of write once, read many (WORM) storage for the data of the one or more encrypted chunks, the WORM storage comprising one or more of a backup, archive, or snapshot.

8. The method of claim 1, wherein replacing the first system key by determining the second system key is responsive to a key rotation event, the key rotation event comprising one or more of expiration of a key rotation time period, detection of unauthorized access, or receipt of a user input to rotate a system key.

9. A computing system comprising:

a memory storing instructions; and processing circuitry that executes the instructions to:

generate a first encrypted key and a second encrypted key, wherein a data platform stores one or more encrypted chunks, each encrypted chunk of the one or more encrypted chunks encrypted with a data encryption key derived from first encryption key data of the first encrypted key and key data of encrypted key data, the first encrypted key data encrypted with a second encryption key from the second encrypted key, the first encrypted key and the second encrypted key encrypted with a first system key;

replace the first system key by determining a second system key;

encrypt, with the second system key, the first encryption key to generate a replacement first encrypted key and the second encryption key to generate a replacement second encrypted key;

decrypt the replacement first encrypted key to obtain the first encryption key and the first encrypted key data to obtain the key data, wherein the first encryption key and the key data are used derive the data encryption key when decrypting the one or more encrypted chunks; and output data from the one or more encrypted chunks by decrypting the one or more encrypted chunks with the data encryption key.

10. The computing system of claim 9, wherein the one or more encrypted chunks are one or more first encrypted chunks and the encrypted key data is first encrypted key data, and the processing circuitry further executes the instructions to:

encrypt one or more chunks to generate one or more second encrypted chunks, each encrypted chunk of the one or more second encrypted chunks encrypted with a data encryption key derived from the first encryption key of the replacement first encrypted key and key data of second encrypted key data, the second encrypted key data encrypted with the second encryption key of the replacement second encrypted key.

11. The computing system of claim 10, wherein the processing circuitry further executes the instructions to store each encrypted chunk of the one or more second encrypted chunks, along with the second encrypted key data.

12. The computing system of claim 9, wherein the computing system stores each encrypted chunk of the one or more encrypted chunks along with the encrypted key data.

13. The computing system of claim 9, wherein the processing circuitry further executes the instructions to generate an asymmetric key pair comprising a public key and a private key, wherein the second encryption key is the public key of the asymmetric key pair.

14. The computing system of claim 13, wherein to decrypt the first encrypted key data to obtain the key data the processing circuitry further executes the instructions to decrypt the first encrypted key data with the private key.

15. The computing system of claim 9, wherein the one or more encrypted chunks are part of write once, read many (WORM) storage for the data of the one or more encrypted chunks, the WORM storage comprising one or more of a backup, archive, or snapshot.

16. The computing system of claim 9, wherein the processing circuitry further executes the instructions to replace the first system key by determining the second system key responsive to a key rotation event, the key rotation event comprising one or more of expiration of a key rotation time period, detection of unauthorized access, or receipt of a user input to rotate a system key.

17. A computer-readable storage medium comprising instructions that, when executed, cause processing circuitry of a computing system to:

generate a first encrypted key and a second encrypted key, wherein the computing system stores one or more encrypted chunks, each encrypted chunk of the one or more encrypted chunks encrypted with a data encryption key derived from a first encryption key of the first encrypted key and key data of first encrypted key data, the first encrypted key data encrypted with a second encryption key from the second encrypted key, the first encrypted key and the second encrypted key encrypted with a first system key;

replace the first system key by determining a second system key;

encrypt, with the second system key, the first encryption key to generate a replacement first encrypted key and the second encryption key to generate a replacement second encrypted key;

decrypt the replacement first encrypted key to obtain the first encryption key and the encrypted key data to obtain the key data, wherein the first encryption key and the key data are used derive the data encryption key when decrypting the one or more encrypted chunks; and output data from the one or more encrypted chunks by decrypting the one or more encrypted chunks with the data encryption key.

18. The computer-readable storage medium of claim 17, wherein the one or more encrypted chunks are one or more first encrypted chunks and the encrypted key data is first encrypted key data, and the instructions, when executed, cause processing circuitry of a computing system to:

encrypt one or more chunks to generate one or more second encrypted chunks, each encrypted chunk of the one or more second encrypted chunks encrypted with a data encryption key derived from the first encryption key of the replacement first encrypted key and key data of second encrypted key data, the second encrypted key data encrypted with the second encryption key of the replacement second encrypted key.

19. The computer-readable storage medium of claim 17, wherein the one or more encrypted chunks are part of write once, read many (WORM) storage for the data of the one or more encrypted chunks, the WORM storage comprising one or more of a backup, archive, or snapshot.

20. The computer-readable storage medium of claim 17, wherein the instructions, when executed, cause processing circuitry of a computing system to replace the first system key by determining the second system key responsive to a key rotation event, the key rotation event comprising one or more of expiration of a key rotation time period, detection of unauthorized access, or receipt of a user input to rotate a system key.

\* \* \* \* \*